(12) United States Patent
Cheskis et al.

(10) Patent No.: US 9,733,373 B2
(45) Date of Patent: *Aug. 15, 2017

(54) SYSTEMS AND METHODS FOR AUTOMATED IDENTIFICATION OF SURFACES FOR BUILDING OF GEOLOGIC HYDRODYNAMIC MODEL OF OIL AND GAS DEPOSIT BY SEISMIC DATA

(71) Applicant: OOO Rock Flow Dynamics, Moscow (RU)

(72) Inventors: Olga Andreevna Cheskis, Moscow (RU); Semen Leonidovich Tregub, Moscow (RU); Andrey Sergeevich Kazarov, Moscow (RU)

(73) Assignee: OOO Rock Flow Dynamic, Moscow (RU)

( * ) Notice: Subject to any disclaimer, the term of this patent is extended or adjusted under 35 U.S.C. 154(b) by 779 days.

This patent is subject to a terminal disclaimer.

(21) Appl. No.: 14/094,810

(22) Filed: Dec. 3, 2013

(65) Prior Publication Data

US 2014/0156245 A1 Jun. 5, 2014

(51) Int. Cl.
*G01V 1/28* (2006.01)
*G01V 1/30* (2006.01)

(52) U.S. Cl.
CPC .......... *G01V 1/302* (2013.01); *G01V 2210/64* (2013.01); *G01V 2210/641* (2013.01); *G01V 2210/66* (2013.01); *G01V 2210/667* (2013.01)

(58) Field of Classification Search
None
See application file for complete search history.

(56) References Cited

U.S. PATENT DOCUMENTS

| 2003/0132934 A1* | 7/2003 | Fremming | G01V 1/30 345/419 |
| 2011/0002194 A1* | 1/2011 | Imhof | G01V 1/32 367/53 |
| 2014/0156246 A1* | 6/2014 | Cheskis | G01V 1/302 703/10 |

FOREIGN PATENT DOCUMENTS

| RU | 2289829 C1 | 12/2006 |
| RU | 2390805 C1 | 5/2010 |

* cited by examiner

*Primary Examiner* — Omar Fernandez Rivas
*Assistant Examiner* — Herng-Der Day
(74) *Attorney, Agent, or Firm* — TransPacific Law Group; Pavel I. Pogodin, Esq.

(57) ABSTRACT

The invention generally relates to methods of modeling and building models of oil-and-gas deposits. More particularly, the invention relates to a computer-implemented method, a computerized system, and a computer-readable medium designed for automated identification of surfaces for building a geologic-hydrodynamic model of an oil and gas deposit based on seismic data. A technical result is the improvement of the accuracy of building a geological-hydrodynamic model of an oil-and-gas deposit. The objective of embodiments of the invention is to provide a method, device, and a non-transitory computer-readable medium designed for the implementation of stages accounting for a considerable part of the entire problem of building a geological-hydrodynamic model, namely, automated (that is, requiring the user to participate only in the stage of initial data input) building of a set of surfaces based on input seismic data. The output surfaces can be used, without additional processing, to construct a geological-hydrodynamic grid.

15 Claims, 4 Drawing Sheets

SYSTEMS AND METHODS FOR AUTOMATED IDENTIFICATION OF SURFACES FOR BUILDING OF GEOLOGIC HYDRODYNAMIC MODEL OF OIL AND GAS DEPOSIT BY SEISMIC DATA

CROSS-REFERENCE TO RELATED PATENT APPLICATIONS

This U.S. patent application is related to the following U.S. patent applications: U.S. patent application Ser. No. 14/094,773 entitled "SYSTEMS AND METHODS FOR DETERMINING POSITION OF MARKER DEPTH COORDINATES FOR CONSTRUCTION OF GEOLOGICAL MODEL OF DEPOSIT," U.S. patent application Ser. No. 14/094,776 entitled "SYSTEMS AND METHODS FOR DETERMINING POSITION OF MARKER DEPTH COORDINATES FOR CONSTRUCTION OF GEOLOGICAL MODEL OF DEPOSIT," U.S. patent application Ser. No. 14/094,779 entitled "SYSTEM FOR DETERMINING POSITION OF MARKER DEPTH COORDINATES FOR CONSTRUCTION OF GEOLOGICAL MODEL OF DEPOSIT," and U.S. patent application Ser. No. 14/094,783 entitled "SYSTEM FOR DETERMINING POSITION OF MARKER DEPTH COORDINATES FOR CONSTRUCTION OF GEOLOGICAL MODEL OF DEPOSIT," all of which are incorporated by reference herein in their entirety. This U.S. patent application is also related to U.S. patent application Ser. No. 14/095,972 filed on the same day and entitled "SYSTEM FOR AUTOMATED IDENTIFICATION OF SURFACES FOR BUILDING OF GEOLOGIC—HYDRODYNAMIC MODEL OF OIL AND GAS DEPOSIT BY SEISMIC DATA," which is incorporated by reference herein in its entirety.

BACKGROUND OF THE INVENTION

Technical Field

The described embodiments generally relate to methods of modeling and building models of oil and gas deposits. In particular, the described embodiments relate to a computer-implemented method, computerized system, and a computer readable medium designed for automated identification of surfaces for building a geologic-hydrodynamic model of an oil and gas deposit based on seismic data.

Description of the Related Art

A method for building 3D geological structures based on surface data is presented in G. Caumon et al., "Surface-Based 3D Modeling of Geological Structures", 23 Sep. 2009, which describes a close integration of surface data in geological modeling. The aforesaid method identifies nodes on the surface of grid boundary, which intersect other surfaces. Limitations on the thickness and range are introduced during interpolation to build surfaces spaced a given distance apart. The distance is evaluated on a vector field.

A method of geophysical exploration for identifying oil-and-gas features is described in RU 2289829 C1, G01V 11/00, 20, Dec. 2006, which describes optimizing the location of deep wells at oil-and-gas features by a set of data of land seismics, as well as electrical, magnetic, and gravity exploration; electric, radioactive, acoustic, seismic, magnetic, and gravity logging; core analysis and well tests. Data of acoustic, seismic, electric, radioactive, magnetic, and gravity logging, as well as laboratory core studies are used to build stiffness, electric, magnetic, and gravimetric models of the target interval of geological section in wells, evaluate geophysical synthesized traces, which are used to carry out Spectral-time analysis of seismic records (SWAN) and to determine model SVO and their spectral-time attributes (STA). The spectral-time attributes (STA) are the ratios of the energy of high frequencies and long times to the energy of low frequencies and short times, as well as the products of specific spectral density multiplied by the weighted mean frequency and time or by maximal frequency and time of energy spectra of SVAN column along the axes of frequencies and times.

Various methods for building digital geological models of oil-and-gas deposits and designing their development with the use of digital geological models proposed by Geoneftegas Company are also known, see www.geoneftegaz.ru/models/mod.htm. The aforesaid company suggests solutions for implementing a digital geological model, built with the use of a technology allowing the reservoir properties and the oil-bearing capacity of carbonate and terrigenous beds to be studied in complicated media with tectonic and lithological screening, enabling the estimation of oil reserves by commercial categories. This solution is used to calculate geological-technological hydrodynamic models and to optimize development projects. The application of this technology for forecasting the reservoir properties and oil-bearing capacity makes it possible to build sound 3D geological models with minimal volume of deep drilling. Their involvement in the process of calculation and analysis of development process characteristics allows the formation of optimal process schemes and accelerates the commissioning of new facilities. The analysis of verifiability of reservoir parameter estimates, including effective thickness, porosity, and fluid type by data of newly drilled wells suggests good agreement between the results.

A method for the control of geometric and hydrodynamics parameters of reservoir hydraulic fracturing is described in RU 2390805 C1, G01V 5/12, 27, May 2012. In the aforesaid method, before reservoir fracturing, radon concentration were measured in pits 50 to 70 cm in depth in a grid with 50 m step within a 400 m×400 m square area centered in the well mouth. Data of surface surveys are used to draw lines of geodynamic zones, which can be related to newly formed fracture systems caused by hydraulic fracturing (because of high pressure). Radon indicator studies are carried out in the well before the hydraulic fracturing, and the engineering conditions of the well are determined: behind-casing fluid movement, if any, its direction, the percentage distribution of the pumped liquid between such flows, water injection profile based on data of measurements with three repetitions, and the permeability.

A drawback of the described conventional solutions is that they fail to ensure the building of a high-accuracy model of an oil-and-gas deposit based on seismic data alone. Therefore, new and improved techniques capable of generating of high-accuracy geological models based on seismic data are needed.

SUMMARY OF THE INVENTION

The embodiments described herein are directed to methods and systems that substantially obviate one or more of the above and other problems associated with conventional systems and methods for constructing of geological models.

In accordance with one aspect of the embodiments described herein, there is provided a computer-implemented method, a computerized system, and a non-transitory computer-readable medium for the performing of operations accounting for a considerable part of the entire problem of building a geological-hydrodynamic model, namely, automated (that is, requiring the user to participate only in the step of initial data input) building of a set of surfaces based on input seismic data. The output surfaces can be used, without additional processing, to construct a geological-hydrodynamic grid. The input data for the method are volumes of seismic data P, Q; seismic volume (optional).

A technical result achievable using one or more embodiments described herein is the improvement of the accuracy of building a geological-hydrodynamic model of an oil-and-gas deposit.

In one embodiment, the described method incorporates steps, wherein: 1) a model grid with specified pitch and maximal allowable value on coordinate grid is determined; 2) control parameters of surfaces relative to the grid pitch are specified; 3) a set of grid surfaces with respect to its pitch is determined; 4) a domain in which the surface is determined is specified and grid nodes where it is not specified are added; 5) the parameters of the volumes of seismic attributes p, q are specified; the coordinates X, Y of the newly added node are specified; the coordinates of the adjacent node x, y, in which the surface is determined are specified; and the surface depth parameter in this node $z(x,y)$ is specified; 6) the depths of the surfaces in the given grid node are arranged in increasing order and the depth of the ith surface in this node is assigned the ith depth; 7) surfaces for processing are determined; 8) functionals and gradients of surfaces for processing are determined; 9) the sizes of the current step along the gradient are determined; 10) for each surface to be processed, it is determined what number of steps is required for the minimal value of the functional to be attained; in that case, 11) when the minimal value of the functional for each processed surface is less than the step along the gradient, the displacement along the gradient is made by the found number of steps; 12) the size of this displacement is saved in the memory, and the maximum of displacements is determined; 13) the surfaces for which a decrease in the functional was obtained are temporarily excluded from processing; 14) the surfaces for which the functional was not decreased are determined, and once this is done, steps 7) to 13) are reiterated; 15) the depths of the surfaces determined in the given grid node are rearranged in increasing order and the depth of the ith surface is assigned the ith depth; 16) the values of the current grid pitches are determined from the new data on surfaces; 17) steps 3 to 17 are reiterated until a model with parameters specified at steps 1 and 2 is obtained.

In accordance with another aspect of the embodiments described herein, there is provided a computerized system for implementing the method described above. The computerized system can be represented by, but is not limited to a supercomputer, personal computer, portable computer, tablet computer, hand-held computer, smartphone, etc. The computerized system may incorporate one or a plurality of processors intended for executing computer commands or codes, which are stored in the memory of the computerized system with the aim to implement the first or second variant of this invention, a non-transitory computer-readable medium (memory) and input/output moduli (I/O). The I/O moduli are represented by, but not limited to standard and known from the technical level control means for the computerized system: mouse, keyboard, joystick, touchpad, trackball, beam pen, stylus, sensor display, etc. The I/O moduli also are represented by, but not limited to typical and known from the technical level means for displaying information: monitor, projector, printer, graph-plotter, etc. As an example, but not limitation, the non-transitory computer-readable medium may contain random-access memory (RAM); read-only memory (ROM); electronically erasable programmable read-only memory (EEPROM); flash-memory, or other memory technologies; CDROM, digital versatile disk (DVD), or other optical or holographic data carriers; magnetic cassettes, magnetic tape, magnetic disk storage or other magnetic memory devices, carrying waves or other data carriers, which can be used for coding the required data and accessed by a computerized system described above.

In accordance with yet another aspect of the embodiments described herein, there is provided a non-transitory computer-readable medium embodying instructions for performing the method described above. As an example, and not limitation, the non-transitory computer-readable medium may contain random-access memory (RAM); read-only memory (ROM); electronically erasable programmable read-only memory (EEPROM); flash-memory, or other memory technologies; CDROM, digital versatile disk (DVD), or other optical or holographic data carriers; magnetic cassettes, magnetic tape, magnetic disk storage or other magnetic memory devices, carrying waves, or other data carriers, which can be used for coding the required data and accessed by the computerized system described in connection with the above embodiments the invention, and which, accordingly, are not described in more detail.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Figure 1:
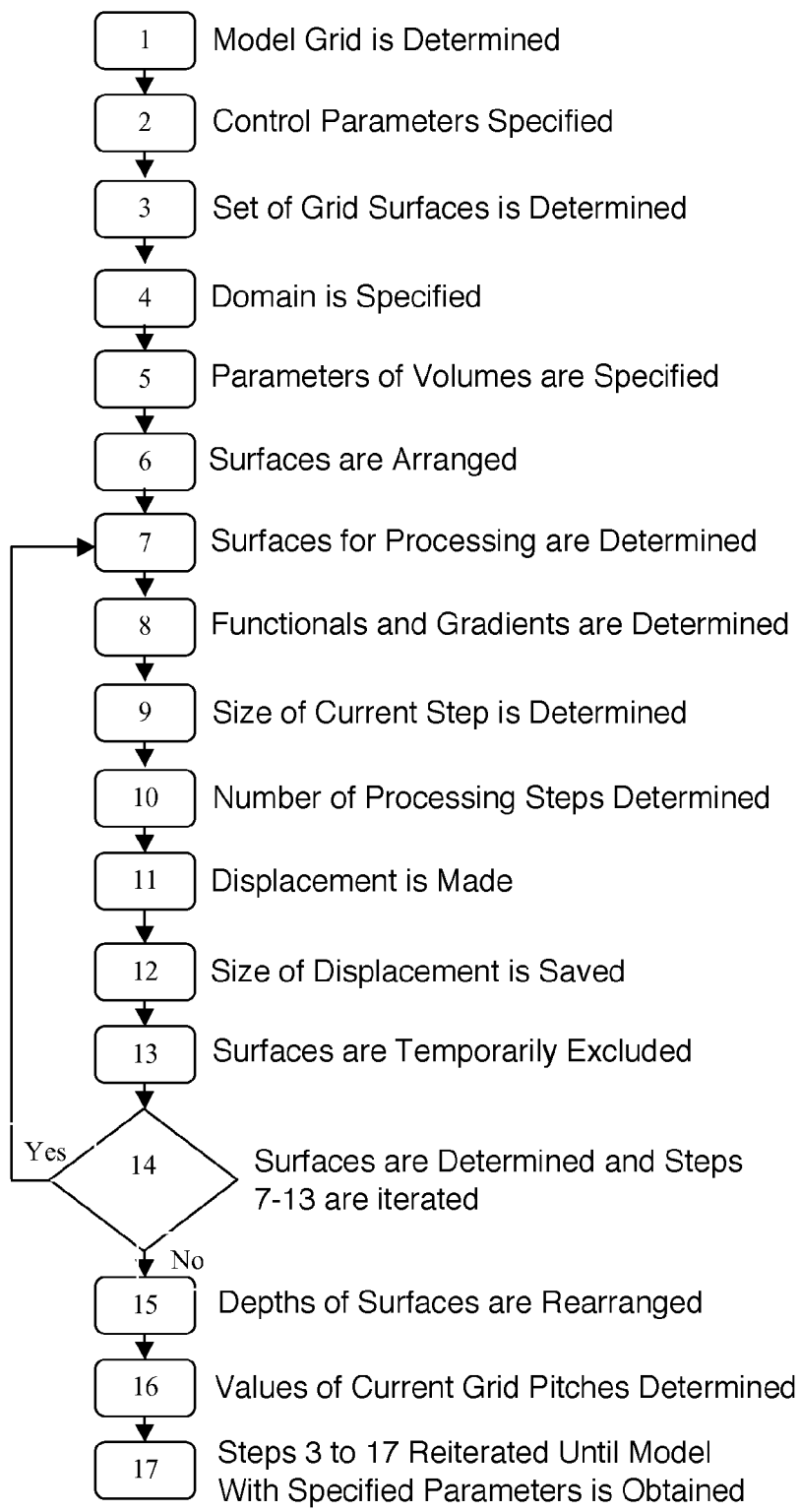
FIG. 1 illustrates a flowchart of an exemplary embodiment of a method described herein.

FIG. 1 illustrates a flowchart of an exemplary embodiment of a method described herein. Specifically, at step 1 a model grid with specified pitch and maximal allowable size on the coordinate grid is determined. At step 2, control parameters of surfaces relative to the grid pitch are specified. Additional steps include: step 3, at which a set of grid surfaces with respect to its pitch is determined; step 4, at which a domain in which the surface is determined is specified and grid nodes where it is not specified are added; step 5, at which the parameters of the volumes of seismic data p, q are specified; the coordinates X, Y of the newly added node are specified; the coordinates of the adjacent node x, y, in which the surface is determined are specified; and the surface depth parameter in this node z(x,y) is specified; step 6 at which the surfaces in the given grid node are arranged by increasing depth and the depth of the ith surface in this node is assigned the ith depth; step 7, at which surfaces for processing are determined; step 8, at which functionals and gradients of surfaces for processing are determined; step 9, at which the size of the current step along the gradient is determined; step 10, at which, for each surface to be processed, it is determined what number of steps is required for the minimal value of the functional to be attained; in that case, at step 11, when the minimal value of the functional for each processed surface is less than the step along the gradient, the displacement along the gradient is made over the previously found number of steps; step 12, at which the size of this displacement is saved in the memory, and the maximum of displacements is determined; step 13, at which the surfaces for which a decrease in the functional was obtained are temporarily excluded from processing; step 14, at which the surfaces for which the functional was not decreased are determined, and once this is done, steps 7 to 13 are reiterated; step 15, at which the depths of the surfaces determined in the given grid node are rearranged in increasing order and the depth of the ith surface is assigned the ith depth; step 16, at which the values of the current grid pitches are determined from the new data on surfaces; step 17, at which steps 3 to 17 are reiterated until a model with parameters specified at steps 1 and 2 is obtained.

Various embodiments of the methods described herein enables a set of surfaces, which ensures the best agreement with the input data, i.e., seismic attributes P and Q, to be obtained for a set of surfaces chosen as an initial approximation. The agreement is understood as follows. By their physical meaning, the seismic attributes P and Q in combination determine a field of planes. A functional is introduced, which is equal to the deviation of the tangent plane in each point of the surface from this field. The minimum of this functional is sought for by method of quickest descent along the gradient adapted to the problem.

The success in the implementation of the method is ensured by the following criteria:

1. Simultaneous (parallel) identification and subsequent improvement of a large enough number of surfaces;

2. A family of functionals, the minimization of which forms the basis of successful implementation of the method;

3. The execution of the method looks as a chain of iteration steps. The output data of each step, after appropriate transformation, enter the following step.

4. The optimal choice of initial approximations, supplied to the entry of iteration algorithms, which minimize the functionals.

The correlation of surfaces is carried out with the aim to derive information required for predicting the composition and properties of rocks. The correlation of a surface is the process of the passage from a trace of the seismic volume of wave phase to another such trace, corresponding to the same reflecting boundary. In other words, this is the process of tracing the reflecting surfaces proper. The surfaces are correlated by the zero, negative, or positive phase.

Various embodiments of the methods describe herein suggest the use of not the seismic volume proper, but derived data, i.e., the so-called seismic attributes P and Q. Those attributes, for each point of each trace, show the angle, at which the maximally similar point at the nearby trace is situated. Thus, we can assume that those attributes determine a field of tangent planes to the reflecting surfaces. Now the problem reduces to constructing surfaces for which this field of planes is tangent. This is made by minimizing the functional. A functional is introduced, which measures the total deviation of the field of planes specified by P, Q attributes from the tangent planes to surfaces of the set. The gradient descent method enables the passage to a new set of surfaces, for which the value of the functional is smaller, hence a better agreement with the input data.

The method in general includes the steps used at each iteration of its implementation:

1. "Spreading". The problem of continuation of the surface into the domains where it is not determined is solved. This step is used, in particular, in the construction of initial approximations.

2. "Improvement." The construction of an integral surface by the field of (tangent) planes determined by P, Q volumes based on minimizing the functional.

3. "Sorting." Transformation of surfaces, over the depth. The problem of exclusion of intersection of surfaces is solved.

4. "Drawing" toward extremums (maximums and minimums).

Next, the steps are described in detail.

"Spreading" Step

Input: set of surfaces. The surfaces are defined not over the entire grid.

p, q are volumes of seismic attributes

Output: set of surfaces with a wider definition domain.

To be performed within a loop:

1. For each surface add, to the surface definition domain, grid nodes in which the surface is not defined, but which have a neighbor grid node in which it is defined.

2. If no nodes could be added to any surface, exit the loop.

3. For each of the newly added nodes:

A) Evaluate the formula:

$$Z = \frac{\sum \frac{(z(x,y) + (X-x) \times p(x,y,z) + (Y-y) \times q(x,y,z))}{\sqrt{(X-x)^2 + (Y-y)^2}}}{\sum \frac{1}{\sqrt{(X-x)^2 + (Y-y)^2}}}$$

Here p, q are volumes of seismic attributes, X, Y are coordinates of the newly added node, x, y are coordinates of the adjacent node in which the surface is defined, and z(x,y) is the depth of the surface at this node. The sum is extended to all adjacent nodes in which the surface is defined.

B) Check that the surface thus extended lies within the required domain in the space.

The meaning of the above formula is as follows. For each adjacent node, the expression z(x,y)+(X−x)×p(x,y,z)+(Y−y)×q(x,y,z) is a linear Taylor approximation of the value in the new node based on that in the adjacent node. Such linear approximations for all adjacent nodes are then averaged with weights. The weights are inversely proportional to the distances between the added and adjacent nodes.

4. If the value could not be evaluated in any added node, then the surface is defined in every node of the grid.

"Improvement" Step

Input: a set of surfaces as the initial or start approximation, p, q are volumes of seismic attributes A functional is minimized, which is equal to the sum of square deviations of partial derivatives with respect to x, y of equations describing the surfaces from the values of P and Q of the attributes, respectively:

$$F = \sum \left[\frac{\partial z}{\partial x}(x_i, y_j) - p(x_i, y_j, z_{i,j})\right]^2 + \sum \left[\frac{\partial z}{\partial y}(x_i, y_j) - q(x_i, y_j, z_{i,j})\right]^2$$

The sum embraces all nodes and all surfaces of the set.

The functional is minimized by the quickest gradient descent, appropriately optimized and adapted to the case.

Scheme of the step:

1. Calculate, what surfaces will be processed: if the step made at the previous steps was too small, they will not be processed.
2. Evaluate the functional.
3. Evaluate the gradient.
4. Next in the loop:
5. Evaluate the current step in the displacement along the gradient.
6. For each surface to be processed: move along the gradient with this step and determine how many steps will be required to reach the minimal value of the functional.
7. For each surface to be processed: if the obtained minimal value of the functional is less than the input value, then: make the obtained number of steps along the gradient.
8. Save the size of the displacement and calculate the maximum of the displacements made.
9. Temporarily exclude the surface from the processing (i.e., the surfaces for which a decrease in the functional was attained are temporarily excluded from processing).
10. Check, whether the functional has been decreased for all surfaces. If this is so, exit the loop and stop the algorithm.
11. If the functional has not been decreased for all surfaces, but the current step of displacement is small enough, exit the loop.
12. Otherwise, return to the beginning of the loop. (Only the surfaces for which the functional could not be decreased will be processed at the next step of the loop).

"Sorting" Step

With the use of this simple procedure, the depths that correspond to a surface can be assigned to another surface. Through this procedure, the surfaces as if "push" one another toward the correct solution.

Scheme:

Loop over all nodes:

1. Order the surfaces in this node by ascending depth.
2. Assign the ith depth in the node to the ith surface in the ordered series.

Step "Drawing"

A simple procedure, in which each point of each surface in a certain neighborhood in terms of depth is moved toward a local minimum or maximum of the seismic volume. If no extremum was found in the specified neighborhood, the point is discarded. Thus, we obtain a set of surfaces in better agreement with the seismic data. This procedure is also of use for neutralizing typical problems of application of gradient descent method.

Scheme:

Loop over all nodes:

Loop over the set of surfaces

1. Take the point on the surface that corresponds to the node.
2. Take the segment of the appropriate trace of the seismic volume around this point and find in this segment the required local extremum (maximum or minimum) nearest to the point.
3. If a local extremum was found, replace the depth of the surface in this node by the depth of the local extremum.
4. If no local extremum was found, a gap will appear in the surface, i.e., the surface is assumed not determined in this node.

The description of the main operations for implementing the method of automated identification of surfaces for building geological-hydrodynamic model of an oil-and-gas deposit based on seismic data:

Input: a set of trend surfaces as the initial or start approximation. When no such surfaces are available, surfaces constant over depth are used.

P, Q are volumes of seismic attributes

Optional: seismic volume

Output: a set of surfaces used to build a geological-hydrodynamic grid.

The first approximation is trend surfaces (in the absence of such, constant surfaces are used) on a coarse grid. Each iteration is a combination of procedures described above. Each subsequent iteration is made on a finer grid with the solution at the previous iteration taken as an initial approximation. Iterations are repeated until the maximal size of grid is obtained.

Scheme of implementation of the method:

To be executed in a loop:

Step 1. Set the control parameters of the algorithm in accordance with the current sizes of grid (surface) pitches.

Step 2. Convert the available current set of surfaces to a grid with current pitches.

Step 3. If a seismic volume is specified, execute the procedure of "drawing" to extremums.

Step 4. Use "spreading" procedure to extend the set of surfaces to the grid points where they are not defined.

Step 5. Eliminate the mutual intersections of surfaces from the set by "sorting" procedure.

Step 6. Apply the procedure of "improvement" of the set of surfaces by minimizing the functional by gradient descent method.

Step 7. Eliminate the mutual intersections of surfaces from the set by "sorting" procedure.

Step 8. If the grid has reached its maximal size, then exit the loop.

Step 9. Recalculate the values of current grid pitches for a new loop.

Step 10. Transfer to the beginning of the loop.

Figure 2:
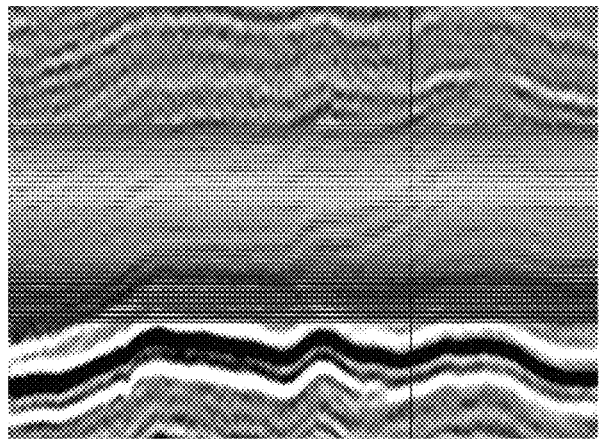
FIGS. 2, 3 and 4 illustrate the results of the execution of iterations of the method described herein performed in connection with building of a geological-hydrodynamic model.
Figure 3:
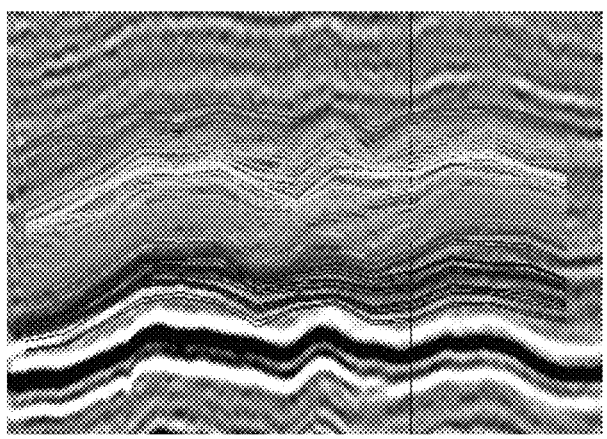
Figure 4:
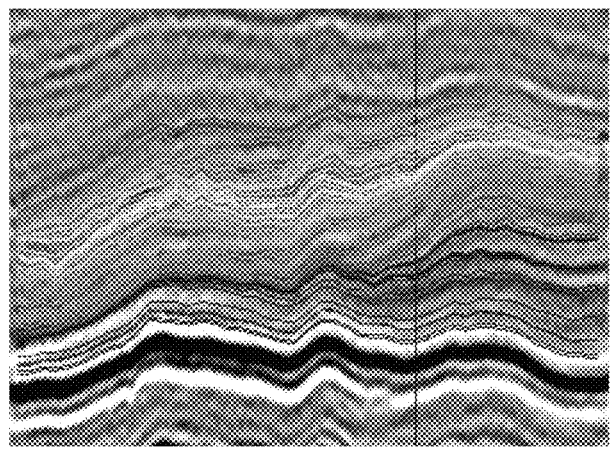

FIGS. 2 to 4 illustrate the results of implementation of iterations of the method in the building of a geological-hydrodynamic model. Attention is hereby called to FIG. 2, showing data, which have not been processed, with maximal achievable values specified on the coordinate grid. In the process of implementation of the method with repeated iterations, the result of processing steadily improves, thus allowing one to obtain more reliable data on the geological-hydrodynamic model of the deposit. FIG. 3 shows an intermediate result, which demonstrates how input data can change after six iterations. FIG. 4 shows a nearly final result, when all or almost all surfaces are determined in accordance with input data after ten iterations.

Figure 5:
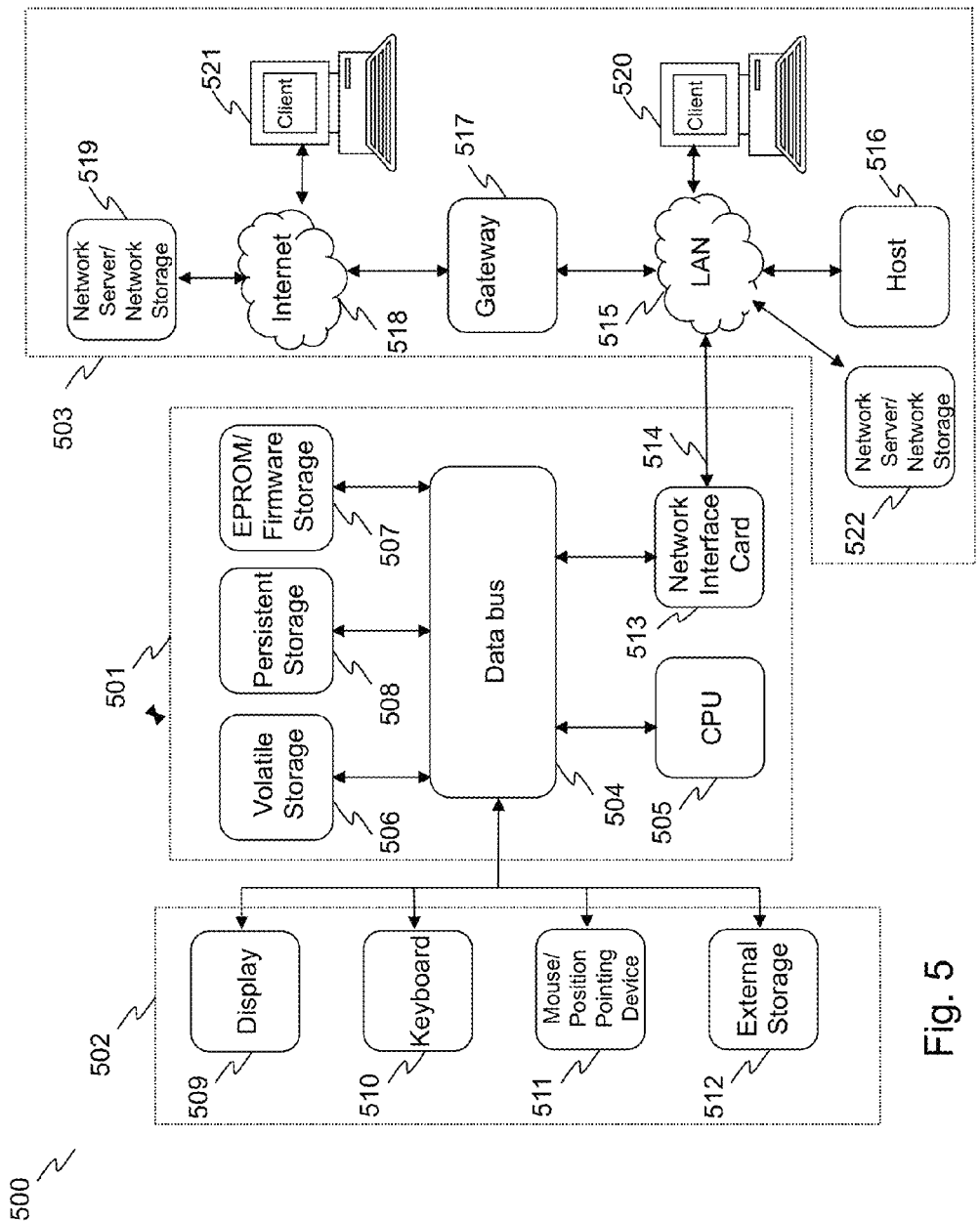
FIG. 5 illustrates an exemplary embodiment of a computer platform upon which the invention may be implemented.

FIG. 5 is a block diagram that illustrates an embodiment of a computer/server system 500 upon which an embodiment of the inventive methodology may be implemented. The system 500 includes a computer/server platform 501, peripheral devices 502 and network resources 503.

The computer platform 501 may include a data bus 504 or other communication mechanism for communicating information across and among various parts of the computer platform 501, and a processor 505 coupled with bus 504 for processing information and performing other computational and control tasks. Computer platform 501 also includes a volatile storage 506, such as a random access memory (RAM) or other dynamic storage device, coupled to bus 505 for storing various information as well as instructions to be executed by processor 505. The volatile storage 506 also may be used for storing temporary variables or other intermediate information during execution of instructions by processor 505. Computer platform 501 may further include a read only memory (ROM or EPROM) 507 or other static storage device coupled to bus 505 for storing static information and instructions for processor 505, such as basic input-output system (BIOS), as well as various system configuration parameters. A persistent storage device 508, such as a magnetic disk, optical disk, or solid-state flash memory device is provided and coupled to bus 501 for storing information and instructions.

Computer platform 501 may be coupled via bus 505 to a display 509, such as a cathode ray tube (CRT), plasma display, or a liquid crystal display (LCD), for displaying information to a system administrator or user of the computer platform 501. An input device 510, including alphanumeric and other keys, is coupled to bus 501 for communicating information and command selections to processor 505. Another type of user input device is cursor control device 511, such as a mouse, a trackball, or cursor direction keys for communicating direction information and command selections to processor 505 and for controlling cursor movement on display 509. This input device typically has two degrees of freedom in two axes, a first axis (e.g., x) and a second axis (e.g., y), that allows the device to specify positions in a plane.

An external storage device 512 may be coupled to the computer platform 501 via bus 505 to provide an extra or removable storage capacity for the computer platform 501. In an embodiment of the computer system 500, the external removable storage device 512 may be used to facilitate exchange of data with other computer systems.

The invention is related to the use of computer system 500 for implementing the techniques described herein. In an embodiment, the inventive system may reside on a machine such as computer platform 501. According to one embodiment of the invention, the techniques described herein are performed by computer system 500 in response to processor 505 executing one or more sequences of one or more instructions contained in the volatile memory 506. Such instructions may be read into volatile memory 506 from another computer-readable medium, such as persistent storage device 508. Execution of the sequences of instructions contained in the volatile memory 506 causes processor 505 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 505 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 508. Volatile media includes dynamic memory, such as volatile storage 506.

Common forms of computer-readable media include, for example, a floppy disk, a flexible disk, hard disk, magnetic tape, or any other magnetic medium, a CDROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 505 for execution. For example, the instructions may initially be carried on a magnetic disk from a remote computer. Alternatively, a remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on the data bus 505. The bus 505 carries the data to the volatile storage 506, from which processor 505 retrieves and executes the instructions. The instructions received by the volatile memory 506 may optionally be stored on persistent storage device 508 either before or after execution by processor 505. The instructions may also be downloaded into the computer platform 501 via Internet using a variety of network data communication protocols well known in the art.

The computer platform 501 also includes a communication interface, such as network interface card 513 coupled to the data bus 505. Communication interface 513 provides a two-way data communication coupling to a network link 514 that is coupled to a local network 515. For example, communication interface 513 may be an integrated services digital network (ISDN) card or a modem to provide a data communication connection to a corresponding type of telephone line. As another example, communication interface 513 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 513 sends and receives electrical, electromagnetic or optical signals that carry digital data streams representing various types of information.

Network link 513 typically provides data communication through one or more networks to other network resources.

For example, network link 515 may provide a connection through local network 515 to a host computer 516, or a network storage/server 522. Additionally or alternatively, the network link 513 may connect through gateway/firewall 517 to the wide-area or global network 518, such as an Internet. Thus, the computer platform 501 can access network resources located anywhere on the Internet 518, such as a remote network storage/server 519. On the other hand, the computer platform 501 may also be accessed by clients located anywhere on the local area network 515 and/or the Internet 518. The network clients 520 and 521 may themselves be implemented based on the computer platform similar to the platform 501.

Local network 515 and the Internet 518 both use electrical, electromagnetic or optical signals that carry digital data streams. The signals through the various networks and the signals on network link 515 and through communication interface 513, which carry the digital data to and from computer platform 501, are exemplary forms of carrier waves transporting the information.

Computer platform 501 can send messages and receive data, including program code, through the variety of network(s) including Internet 518 and LAN 515, network link 515 and communication interface 513. In the Internet example, when the system 501 acts as a network server, it might transmit a requested code or data for an application program running on client(s) 520 and/or 521 through Internet 518, gateway/firewall 517, local area network 515 and communication interface 513. Similarly, it may receive code from other network resources.

The received code may be executed by processor 505 as it is received, and/or stored in persistent or volatile storage devices 508 and 506, respectively, or other non-volatile storage for later execution.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for constructing of geological models. It is intended that the specification and examples be considered as exemplary only, with a true scope and spirit of the invention being indicated by the following claims.

What is claimed is:

1. A computer-implemented method for an automated identification of surfaces in connection with building a geological-hydrodynamic model of an oil-and-gas deposit based on seismic data, the computer-implemented method comprising:

1) determining a model grid with a specified pitch and maximal allowable size on coordinate grid;
2) specifying control parameters of surfaces relative to the grid pitch;
3) determining a set of grid surfaces with respect to its pitch;
4) determining a domain in which each surface of the set of grid surfaces is defined and adding a plurality of grid nodes where no surface is defined;
5) specifying parameters of volumes of seismic data p, q; specifying coordinates X, Y of a newly added grid node of the plurality of grid nodes; specifying coordinates of an adjacent grid node x, y, separate from the newly added node, in which surface is defined; and specifying a surface depth parameter in the adjacent grid node z(x,y);
6) arranging the depths in a grid node of the plurality of grid nodes in increasing order and setting the depth of the i-th surface in this node equal to the i-th depth;
7) determining surfaces for processing;
8) determining functionals of surfaces and gradients of surfaces for processing;
9) determining the size of the current step along the gradient;
10) for each surface to be processed, determining what number of steps is required for a minimal value of the functional to be attained; in that case,
11) when the minimal value of the functional for each processed surface is less than the determined size of the current step along the gradient, making a displacement along the gradient by the found number of steps;
12) determining and storing the size of the displacement along the gradient in a non-transitory memory, and determining a maximum of the displacements made;
13) temporarily excluding the surfaces for which a decrease in the functional was obtained from processing;
14) determining the surfaces for which the functional was not decreased, and once this is done, reiterating steps 7) to 13);
15) rearranging the depths of the surfaces determined in the newly added grid node of the plurality of grid nodes in increasing order and setting the depth of the i-th surface in this node equal to the i-th depth;
16) determining values of the current grid pitches from the new data on surfaces; and
17) reiterating all steps of the method until the geological-hydrodynamic model of the oil-and-gas deposit with parameters specified at steps 1 and 2 is obtained.

2. The computer-implemented method according to claim 1, characterized in that the control parameters comprise a seismic volume.

3. The computer-implemented method according to claim 2, additionally comprising a step at which a point of the surface of grid node is determined, a segment of an appropriate trace of the seismic volume around this point is determined, and a local extremum of the depth nearest to this point in this segment is determined.

4. The computer-implemented method according to claim 3, characterized in that the local extremum is a minimal value of the depth.

5. The computer-implemented method according to claim 3, characterized in that the local extremum is a maximal value of the depth.

6. A computerized system for automated selection of surfaces in connection with building a geological-hydrodynamic model of oil-and-gas deposit based on seismic data, the computerized system comprising:
- one or a plurality of processors;
- input/output modules (I/O);
- a computer-readable medium containing a program code, which, when executed, will induce the one or the plurality of processors to perform method comprising:
  1) determining a model grid with specified pitch and maximal allowable value on coordinate grid;
  2) specifying control parameters of surfaces relative to the grid pitch;
  3) determining a set of grid surfaces with respect to its pitch;
  4) determining a domain in which each surface of the set of grid surfaces is defined and adding a plurality of grid nodes where no surface is defined;
  5) specifying parameters of volumes of seismic data p, q; specifying coordinates X, Y of a newly added grid node of the plurality of grid nodes; specifying coordinates of an adjacent grid node x, y, separate from the newly added node, in which surface is defined; and specifying a surface depth parameter in the adjacent grid node z(x,y);
  6) arranging the depths in a grid node of the plurality of grid nodes in increasing order and setting the depth of the i-th surface in this node equal to the i-th depth;
  7) determining surfaces for processing;
  8) determining functionals of surface and gradients of surfaces for processing;
  9) determining the sizes of the current step along the gradient;
  10) for each surface to be processed, determining what number of steps is required for a minimal value of the functional to be attained; in that case,
  11) when the minimal value of the functional for each processed surface is less than the determined size of the current step along the gradient, making a displacement along the gradient by the found number of steps;
  12) determining and storing the size of the displacement along the gradient in a non-transitory memory, and determining a maximum of the displacements made;
  13) temporarily excluding from processing the surfaces for which a decrease in the functional was obtained;
  14) determining the surfaces for which the functional was not decreased, and once this is done, reiterating steps 7) to 13);
  15) rearranging the depths of the surfaces determined in the newly added grid node of the plurality of grid nodes in increasing order and setting the depth of the i-th surface in this node equal to the i-th depth;
  16) determining values of the current grid pitches from the new data on surfaces; and
  17) reiterating all steps mentioned above until the geological-hydrodynamic model of the oil-and-gas deposit with parameters specified at steps 1 and 2 is obtained.

7. The computerized system according to claim 6, characterized in that the control parameters comprise a seismic volume.

8. The computerized system according to claim 7, characterized in that the program code contains an additional step at which a point of the surface of grid node is determined, a segment of an appropriate trace of the seismic volume around this point is determined, and a local extremum of the depth nearest to this point in this segment is determined.

9. The computerized system according to claim 8, characterized in that the local extremum is a minimal value of the depth.

10. The computerized system according to claim 8, characterized in that the local extremum is a maximal value of the depth.

11. A non-transitory computer-readable medium embodying a asset of instructions, which, when executed by one or more processors, cause the one or more processors to perform a computer-implemented method for an automated identification of surfaces in connection with building a geological-hydrodynamic model of an oil-and-gas deposit based on seismic data, the computer-implemented method comprising:
  1) determining a model grid with a specified pitch and maximal allowable size on coordinate grid;
  2) specifying control parameters of surfaces relative to the grid pitch;
  3) determining a set of grid surfaces with respect to its pitch;
  4) determining a domain in which each surface of the set of grid surfaces is defined and adding a plurality of grid nodes where no surface is defined;
  5) specifying parameters of volumes of seismic data p, q; specifying coordinates X, Y of a newly added grid node of the plurality of grid nodes; specifying coordinates of an adjacent grid node x, y, separate from the newly added node, in which surface is defined; and specifying a surface depth parameter in the adjacent grid node z(x,y);
  6) arranging the depths in a grid node of the plurality of grid nodes in increasing order and setting the depth of the i-th surface in this node equal to the i-th depth;
  7) determining surfaces for processing;
  8) determining functionals of surfaces and gradients of surfaces for processing;
  9) determining the size of the current step along the gradient;
  10) for each surface to be processed, determining what number of steps is required for a minimal value of the functional to be attained; in that case,
  11) when the minimal value of the functional for each processed surface is less than the determined size of the current step along the gradient, making a displacement along the gradient by the found number of steps;
  12) determining and storing the size of the displacement along the gradient in a non-transitory memory, and determining a maximum of the displacements made;
  13) temporarily excluding the surfaces for which a decrease in the functional was obtained from processing;
  14) determining the surfaces for which the functional was not decreased, and once this is done, reiterating steps 7) to 13);
  15) rearranging the depths of the surfaces determined in the newly added grid node of the plurality of grid nodes in increasing order and setting the depth of the i-th surface in this node equal to the i-th depth;
  16) determining values of the current grid pitches from the new data on surfaces; and
  17) reiterating all steps of the method until the geological-hydrodynamic model of the oil-and-gas deposit with parameters specified at steps 1 and 2 is obtained.

12. The non-transitory computer-readable medium according to claim 11, characterized in that the control parameters comprise a seismic volume.

13. The non-transitory computer-readable medium according to claim 12, wherein the computer-implemented method additionally comprises a step at which a point of the surface of grid node is determined, a segment of an appropriate trace of the seismic volume around this point is determined, and a local extremum of the depth nearest to this point in this segment is determined.

14. The non-transitory computer-readable medium according to claim 13, characterized in that the local extremum is a minimal value of the depth.

15. The non-transitory computer-readable medium according to claim 13, characterized in that the local extremum is a maximal value of the depth.

* * * * *